(12) United States Patent
Sharrah et al.

(10) Patent No.: US 9,651,208 B2
(45) Date of Patent: May 16, 2017

(54) PORTABLE LIGHT CHARGEABLE FROM DIFFERENT SOURCES

(71) Applicant: Streamlight, Inc., Eagleville, PA (US)

(72) Inventors: Raymond L. Sharrah, Collegeville, PA (US); Thomas D. Boris, Collegeville, PA (US)

(73) Assignee: Streamlight, Inc., Eagleville, PA (US)

( * ) Notice: Subject to any disclaimer, the term of this patent is extended or adjusted under 35 U.S.C. 154(b) by 0 days.

(21) Appl. No.: 14/103,438

(22) Filed: Dec. 11, 2013

(65) Prior Publication Data

US 2014/0240967 A1 Aug. 28, 2014

Related U.S. Application Data

(60) Provisional application No. 61/768,052, filed on Feb. 22, 2013.

(51) Int. Cl.
*F21L 4/08* (2006.01)
*H02J 7/00* (2006.01)

(52) U.S. Cl.
CPC .............. *F21L 4/08* (2013.01); *H02J 7/0042* (2013.01); *H02J 7/0055* (2013.01); *H02J 2007/0062* (2013.01)

(58) Field of Classification Search
CPC ...... F21V 23/0414; F21V 23/06; F21V 23/04; F21V 21/145; F21V 15/01; F21L 4/085; F21L 4/08; F21L 4/045; F21L 7/00; H01M 10/425; H01M 10/488; H02J 7/0044; H02J 2007/0062; H02J 7/0042; H02J 7/0055

USPC ............ 362/183, 205, 202, 217.13; 320/107, 320/112, 113, 114, 115

See application file for complete search history.

(56) References Cited

U.S. PATENT DOCUMENTS

| | | | |
|---|---|---|---|
| 4,092,580 A | | 5/1978 | Prinsze |
| 5,432,689 A | * | 7/1995 | Sharrah .................. B60Q 3/007 362/183 |
| 5,486,432 A | | 1/1996 | Sharrah |
| 5,633,574 A | | 5/1997 | Sage |
| 6,046,572 A | | 4/2000 | Matthews et al. |

(Continued)

OTHER PUBLICATIONS

PCT International Searching Authority, "Notification of Transmittal of the International Search Report and the Written Opinion of the International Searching Authority, or the Declaration", in PCT/US2014/017401, May 21, 2014, 8 pages.

(Continued)

*Primary Examiner* — Anh Mai
*Assistant Examiner* — Arman B Fallahkhair
(74) *Attorney, Agent, or Firm* — Clement A. Berard, Esq.; Dann, Dorfman, Herrell & Skillman, PC

(57) ABSTRACT

A portable light or device may comprise: a housing for receiving a battery; a light source or other operating element in the housing; an electrical switch actuatable from outside the housing; a control circuit in the housing connecting the operating element in circuit with a battery for selectively energizing the operating element responsive to the electrical switch; a first electrical charging port on the housing coupled to the battery by the control circuit for charging the battery; and a second electrical charging port on the housing coupled to the battery by the control circuit for charging the battery. The second electrical charging port may include a USB connection for receiving battery charging current.

31 Claims, 8 Drawing Sheets

(56) References Cited

U.S. PATENT DOCUMENTS

| | | | |
|---|---|---|---|
| 6,104,162 | A | 8/2000 | Sainsbury |
| D435,679 | S | 12/2000 | Naghi et al. |
| 6,471,064 | B2 | 10/2002 | Gordon |
| 6,569,555 | B1 | 5/2003 | Faris |
| 6,621,225 | B2 | 9/2003 | Bruwer |
| 6,633,152 | B2 | 10/2003 | Sharrah |
| 6,652,115 | B2 | 11/2003 | Sharrah |
| 6,762,584 | B2 | 7/2004 | Harvey |
| 6,952,084 | B2 | 10/2005 | Bruwer |
| 7,394,220 | B2 * | 7/2008 | Huang ............... H02J 7/0045 320/107 |
| 7,435,508 | B2 | 10/2008 | Lee et al. |
| 7,466,082 | B1 | 12/2008 | Snyder |
| 7,582,838 | B2 | 9/2009 | Sharrah |
| 7,688,029 | B2 | 3/2010 | Hoffman |
| 7,825,615 | B2 * | 11/2010 | Chen ............... H01M 10/44 318/139 |
| 7,891,833 | B2 | 2/2011 | Sharrah et al. |
| 8,044,634 | B2 | 10/2011 | Hoffman |
| 8,246,193 | B2 * | 8/2012 | Weng ............... 362/183 |
| 8,356,910 | B2 | 1/2013 | Messinger et al. |
| 8,648,567 | B2 | 2/2014 | Hoffman |
| 9,515,419 | B2 | 12/2016 | Inskeep |
| 2005/0225969 | A1 * | 10/2005 | Chen ............... 362/157 |
| 2005/0280393 | A1 | 12/2005 | Feldmann |
| 2006/0072306 | A1 | 4/2006 | Woodyard |
| 2006/0082991 | A1 | 4/2006 | Hrabal |
| 2006/0091852 | A1 | 5/2006 | Watson |
| 2007/0171082 | A1 * | 7/2007 | Melnik ............... 340/574 |
| 2007/0182368 | A1 | 8/2007 | Yang |
| 2007/0253194 | A1 * | 11/2007 | Sharrah et al. ............... 362/183 |
| 2008/0061739 | A1 * | 3/2008 | Lu ............... H02J 7/0042 320/114 |
| 2009/0147505 | A1 * | 6/2009 | Robinett ............... H02J 7/35 362/183 |
| 2009/0180271 | A1 | 7/2009 | Jachmann |
| 2009/0189548 | A1 | 7/2009 | Hoffman et al. |
| 2010/0177507 | A1 | 1/2010 | West |
| 2010/0219775 | A1 * | 9/2010 | Maglica et al. ............... 315/362 |
| 2010/0271814 | A1 * | 10/2010 | Messinger et al. ............... 362/183 |
| 2010/0301779 | A1 | 12/2010 | Spartano et al. |
| 2012/0033414 | A1 | 2/2012 | Sharrah et al. |
| 2012/0224358 | A1 * | 9/2012 | Noble ............... F21L 4/027 362/158 |
| 2012/0235593 | A1 | 9/2012 | Snyder et al. |
| 2012/0236551 | A1 | 9/2012 | Sharrah et al. |
| 2013/0181661 | A1 * | 7/2013 | Workman et al. ............... 320/107 |
| 2013/0182419 | A1 * | 7/2013 | Worman ............... 362/183 |
| 2013/0343042 | A1 * | 12/2013 | Windom ............... 362/183 |
| 2015/0003050 | A1 * | 1/2015 | Parsons ............... H05B 33/0806 362/158 |
| 2017/0033583 | A1 | 2/2017 | Inskeep |

OTHER PUBLICATIONS

Armament Systems and Procedures, "Triad USB—Micro USB Rechargeable LED Light", Press Release, Aug. 16, 2012, 2 pages, http://www.asp-usa.com/press-releases/triad-usb-micro-usb-rechargeable-led-light.html.

Light Reviewers, "NexTorch myTorch (18650) Review", Feb. 2011, 21 pages, http://lightreviewers.com /2011/02/nextorch-18650-review.html.

European Patent Office, "Supplemental European Search Report", in EP14753570.2, Sep. 7, 2016, 6 pages.

* cited by examiner

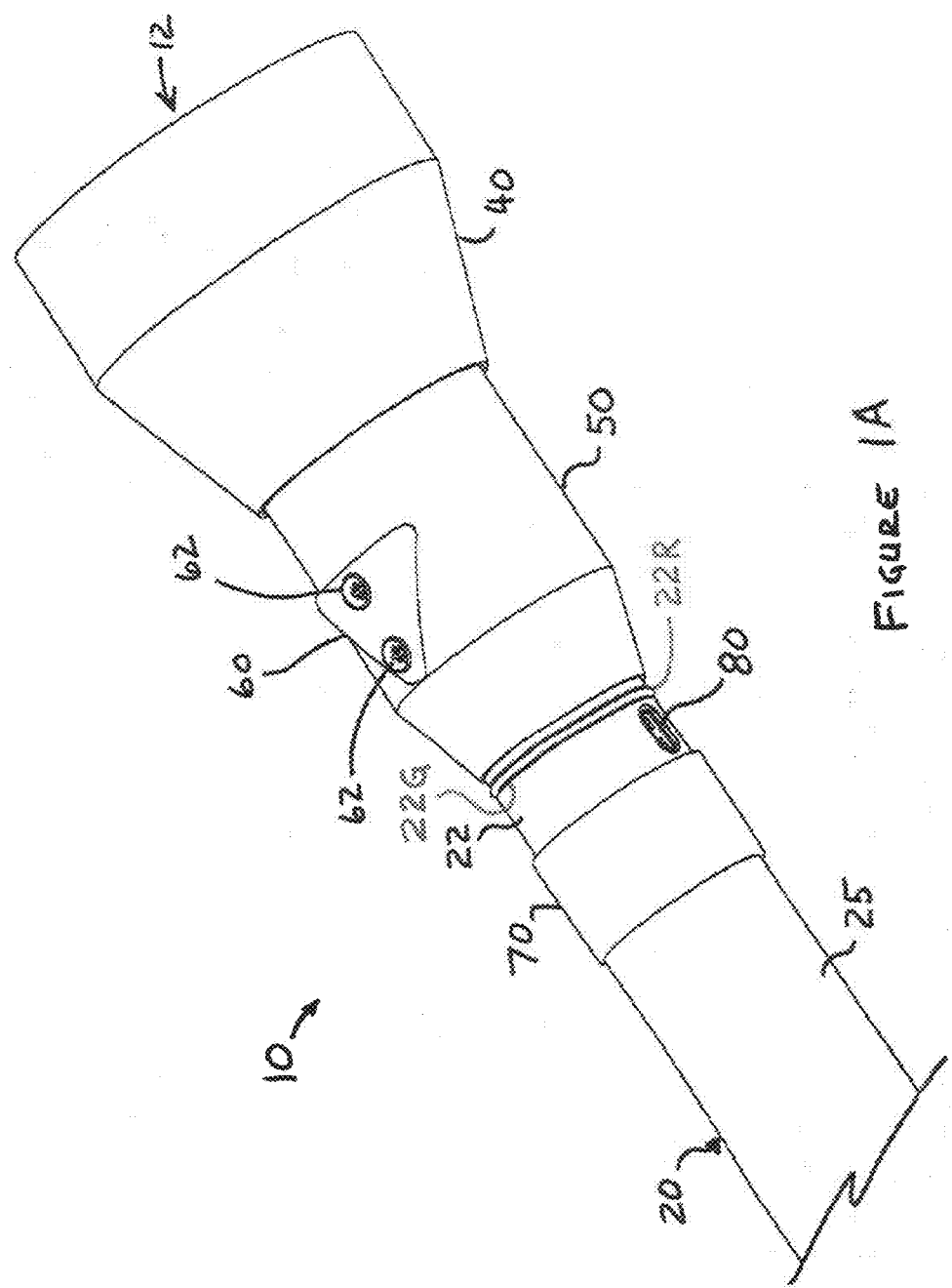

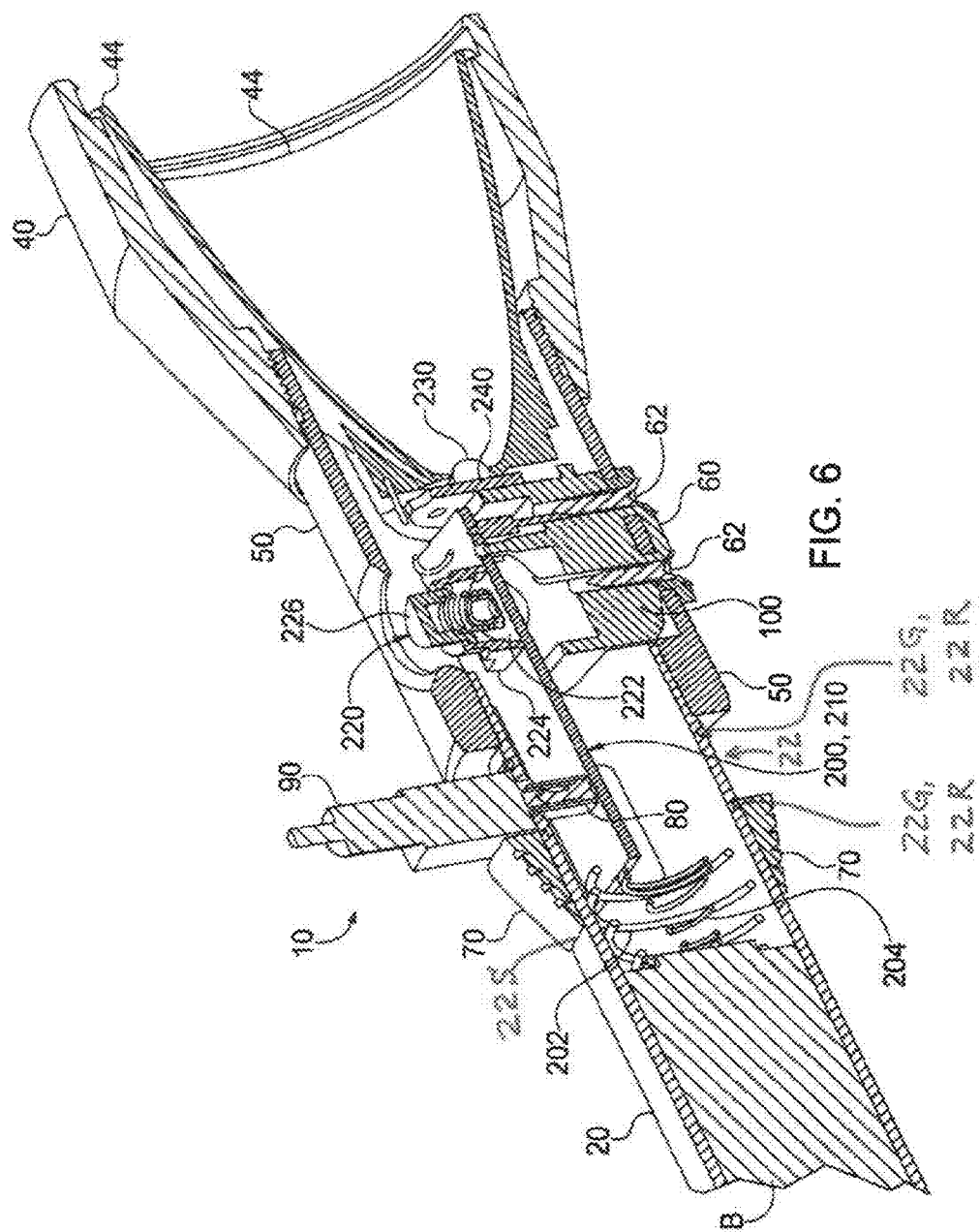

PORTABLE LIGHT CHARGEABLE FROM DIFFERENT SOURCES

This Application claims the benefit of U.S. Provisional Patent Application No. 61/768,052 entitled "PORTABLE LIGHT CHARGEABLE FROM DIFFERENT SOURCES" filed on Feb. 22, 2013, which is hereby incorporated herein by reference in its entirety.

The present invention relates to a portable light or other device and, in particular, to a portable light or other device that is chargeable from different charging sources.

Portable devices such as portable lights including flashlights typically include batteries that supply the electrical power to operate the device. Many such devices utilize rechargeable batteries that reduce the need to replace batteries and that can be maintained at or near full charge in an extended charged standby state until needed. Many if not most rechargeable electronic devices are provided with a charging device that is designed to work with that device. Many charging devices, e.g., particularly those often used by police, fire and other first responders, and those in industrial service, are designed to be installed to a building and/or vehicle and so once installed, are not easily portable.

Many if not most such charging devices have a unique interface with the electronic device they are intended to charge so that electronic devices and chargers are generally not interchangeable. As a result, if a user is not at the location where the charger is located, the user is likely to be unable to charge and/or recharge the electronic device.

Even though electronic devices that may be operated from a USB port are available, in generally they are relatively lower power devices, e.g., small LED reading lights, specifically designed to operate at the nominal plus five (+5) volts and limited current that is available at a standard USB port.

Even where after market and/or "generic" charging devices may be available, and even if they have a connector or configuration that would allow a particular electronic device to be connected thereto, such charging devices may either lack battery charging control circuitry or have charging circuitry that is not compatible with and/or is not suitable for the particular electronic device and/or its battery.

Applicant believes there is a need for a portable light or device that includes control circuitry that would allow the portable light or other device to be connected to commonly available sources of electrical power, e.g., a USB port, that could be utilized for charging and/or recharging its battery in addition to the light or device being rechargeable by its provided external charging device.

Accordingly, a portable light or device may comprise: a housing for receiving a battery; a light source or other operating element in the housing; an electrical switch actuatable from outside the housing; a control circuit in the housing connecting the operating element in circuit with a battery for selectively energizing the operating element responsive to the electrical switch; a first electrical charging port on the housing coupled to the battery by the control circuit for charging the battery; and a second electrical charging port on the housing coupled to the battery by the control circuit for charging the battery.

In summarizing the arrangements described and/or claimed herein, a selection of concepts and/or elements and/or steps that are described in the detailed description herein may be made or simplified. Any summary is not intended to identify key features, elements and/or steps, or essential features, elements and/or steps, relating to the claimed subject matter, and so are not intended to be limiting and should not be construed to be limiting of or defining of the scope and breadth of the claimed subject matter.

BRIEF DESCRIPTION OF THE DRAWING

The detailed description of the preferred embodiment(s) will be more easily and better understood when read in conjunction with the FIGURES of the Drawing which include:

FIG. 1 is a perspective view of an example embodiment of a portable light and FIG. 1A is an enlarged view thereof with a cover thereof in an open position;

FIG. 6 is an enlarged cross-sectional perspective view of the forward portion of an example embodiment of a portable light.

Figure 1:
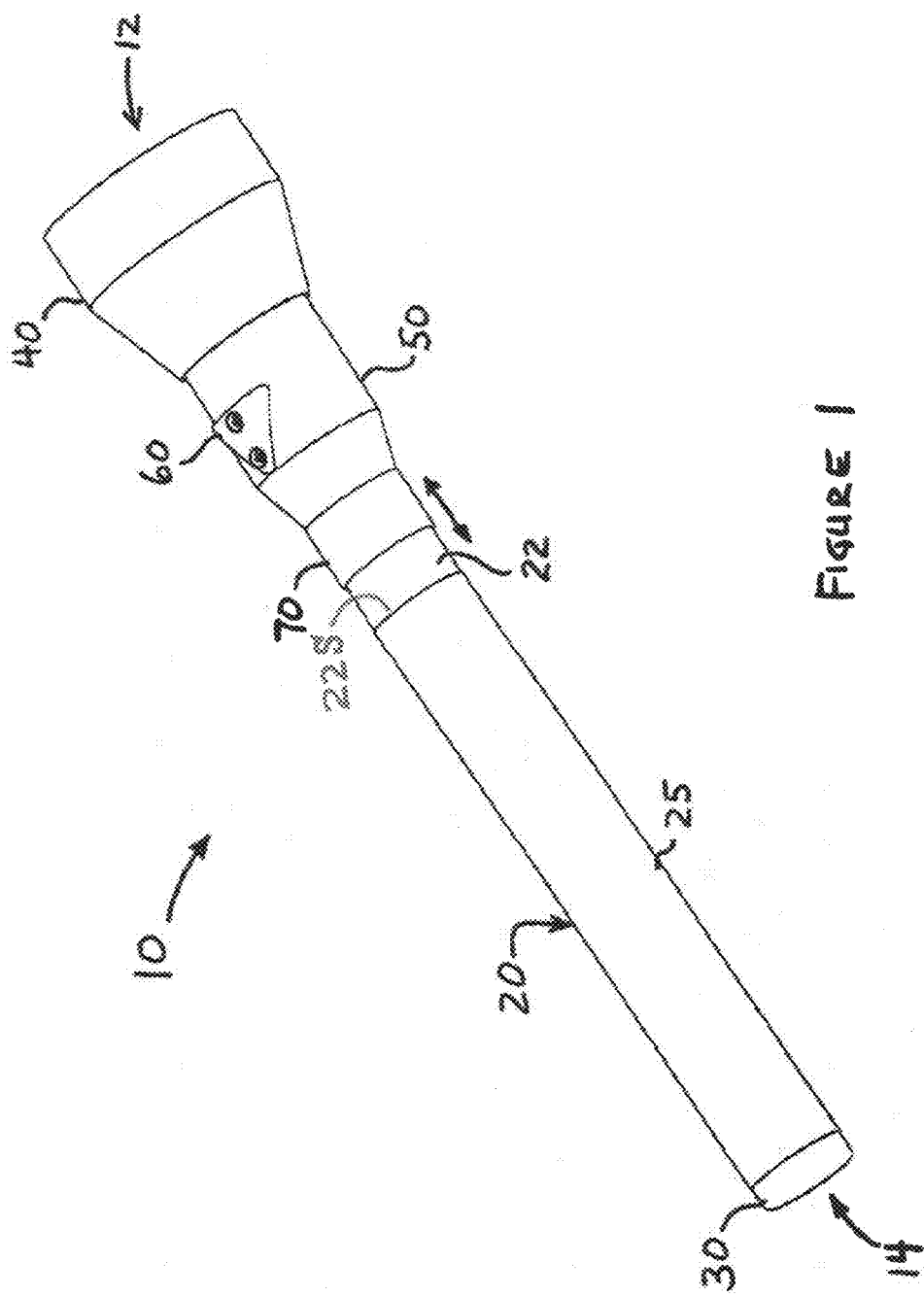

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. According to common practice, the various features of the drawing are not to scale, and the dimensions of the various features may be arbitrarily expanded or reduced for clarity, and any value stated in any Figure is given by way of example only.

DESCRIPTION OF THE PREFERRED EMBODIMENT(S)

Figure 2:
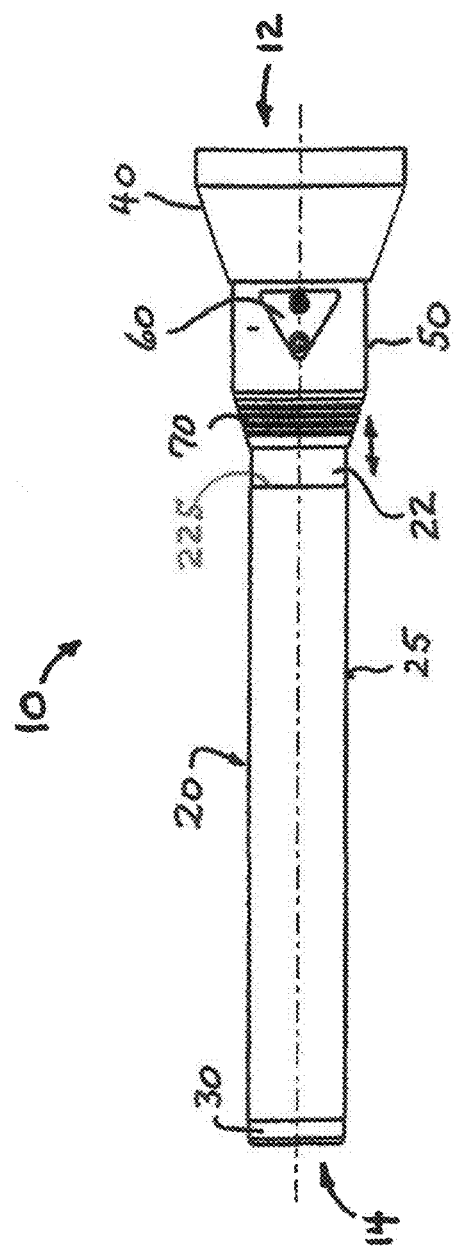
FIG. 2 is a side view of an example embodiment of a portable light and FIG. 2A is a view thereof with a cover thereof in an open position.
Figure 2A:
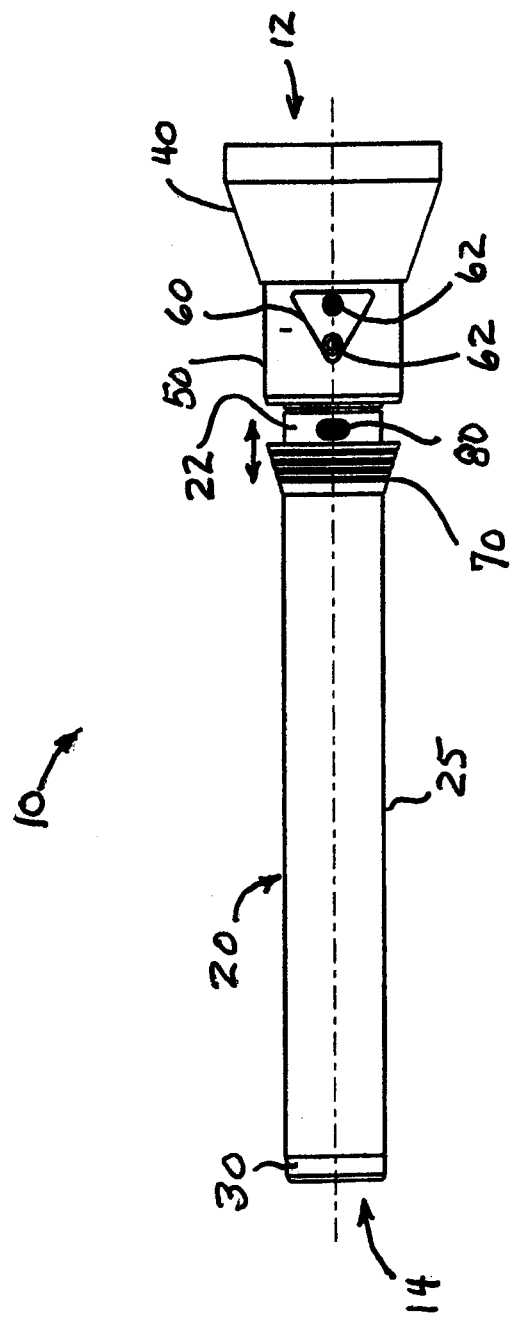

FIG. 1 is a perspective view of an example embodiment of a portable light 10 and FIG. 1A is an enlarged view thereof with a cover 70 thereof in an open position to expose USB port 80, and FIG. 2 is a side view of an example embodiment of the portable light 10 and FIG. 2A is a view thereof with a cover 70 thereof in an open position to expose USB port 80.

Portable light or device 10 comprises a light or device housing 20 which has, e.g., a barrel or handle 25, a head housing 40 and a forward housing 50. Barrel 25 has an internal cavity for receiving one or more batteries, typically plural battery cells whether as individually packaged battery cells or as a package of plural battery cells. A tail cap 30 at the tail or rearward end 14 of light housing 20 provides access for inserting and removing batteries, and may include a pushbutton or other switch (not illustrated) for operating light 10, most commonly when light 10 is of a relatively shorter length.

Head housing 40 includes a light source that may be selectively energized for providing illumination, typically a beam of continuous and/or intermittent light emanating from the head or forward end 12 of light 10. The light source for modern lights is most commonly a light emitting diode (LED) light source, but may be an incandescent, halogen, xenon or other type of lamp. Head housing 40 also typically includes a reflector or a lens, or a total internal reflection (TIR) optic, for shaping the emitted beam of light and for keeping external matter, e.g., debris and/or moisture, from entering light housing 20. A lens is optional when a TIR optic is employed. Typically, the forward end 12 of head housing 40 may be, but need not be, of larger diameter than other parts of light 10, as illustrated.

Forward housing 50 is disposed intermediate barrel 25 and head housing 40 and may be of larger diameter than that of barrel 25 as illustrated, e.g., where desired for accommodating electronic circuitry for operating light 10. On an external surface of forward housing 40 is a charger guide member 60 which is shaped to complement features of a receptacle of a charging device (not shown) into which light 10 is placed for charging and/or recharging the battery or batteries internal to light housing 20. Guide member 60 may be of any suitable shape, but is illustrated as a triangular guide member 60 as is provided on the STINGER® lights available from Streamlight, Inc. of Eagleville, Pa., for guiding light 10 into proper position in the STINGER® charging device (also referred to as a charger) for the charging contacts 62 of guide member 60 to be in electrical contact with corresponding contacts of the charging device.

Light 10 also includes a charging port 62 that is provided by one or more electrical contacts 62 for making electrical connection to a charger. Only one contact is needed where housing 20 is electrically conductive and is employed to serve as a second electrical contact, however, an arrangement having at least two electrical contacts are preferred. Light 10 further includes a second charging port 80 of different type than is charging port 62. Preferably, charging port 80 is a universal serial bus (USB) port wherein the electrical power provided at a standard USB connection, +5 volts between terminals 1 and 4 of the USB connector 80, may also be utilized by light 10 for charging and/or recharging the battery or batteries contained therein.

When USB port 80 is not being used, slidable or movable cover 70 may be slid or moved along housing 25, e.g., forwardly, to cover USB port 80 thereby to reduce any unwanted material, e.g., moisture, dirt and/or other debris, from entering therein, such as by one or more seals 22R in respective grooves 22G. Slidable cover 70 may be slid rearwardly to expose USB port 80 when it is desired to plug a USB cable therein. A double-headed arrow indicates the directions in which movable cover 70 may be moved.

Lights 10 of FIGS. 1 and 2 are substantially identical except for the location of USB port 80 and the cover 70 on housing 20. In FIGS. 1 and 1A, for example, USB port 80 is on the forward portion of barrel 25 of light housing 20 and cover 70 is cylindrical and slides forwardly and rearwardly along the forward end of barrel or handle portion 25 of light housing 20. While USB port 80 may be at any desired radial location, it is illustrated about 90° removed from guide member 60 in this embodiment, but could be at other locations thereon.

In FIGS. 2 and 2A, for example, USB port 80 is near the rearward end of forward housing 50 of light housing 20 and cover 70 is cylindrical internally and conical externally and slides forwardly and rearwardly along the forward end of barrel or handle portion 25 adjacent the rearward end of forward housing 50 so as to appear as part of forward housing 50 when closed. USB port 80 is illustrated about in line with guide member 60 in this embodiment, but could be at other locations thereon. Cover 70 is disposed in a recess 22 in housing 20 defined by a reduced diameter portion 22 of the barrel 25 thereof. The movement of cover 70 toward the head end 12 of light 10 is limited by the forward housing 50 at the forward end of barrel 25 and is limited toward rear or tail end 14 thereof by a shoulder 22S defined at the rearward end of the reduced diameter portion 22 of housing 20, thereby to be retained on light 10. Cover 70 is thus captive on light 10 and is spaced away from ends 12 and 14 thereof.

Figure 3:
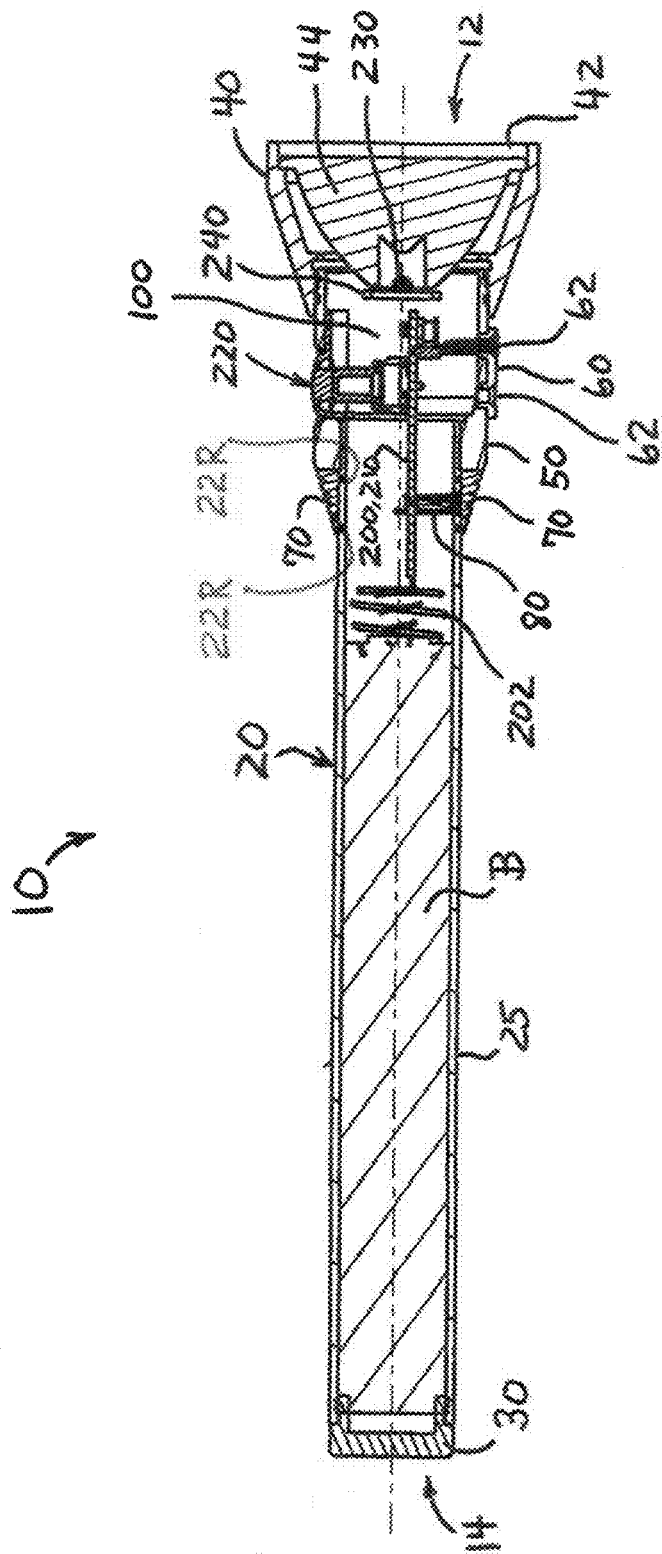
FIG. 3 is a side cross-sectional side view of the example portable light of FIGS. 2 and 2A.
Figure 4:
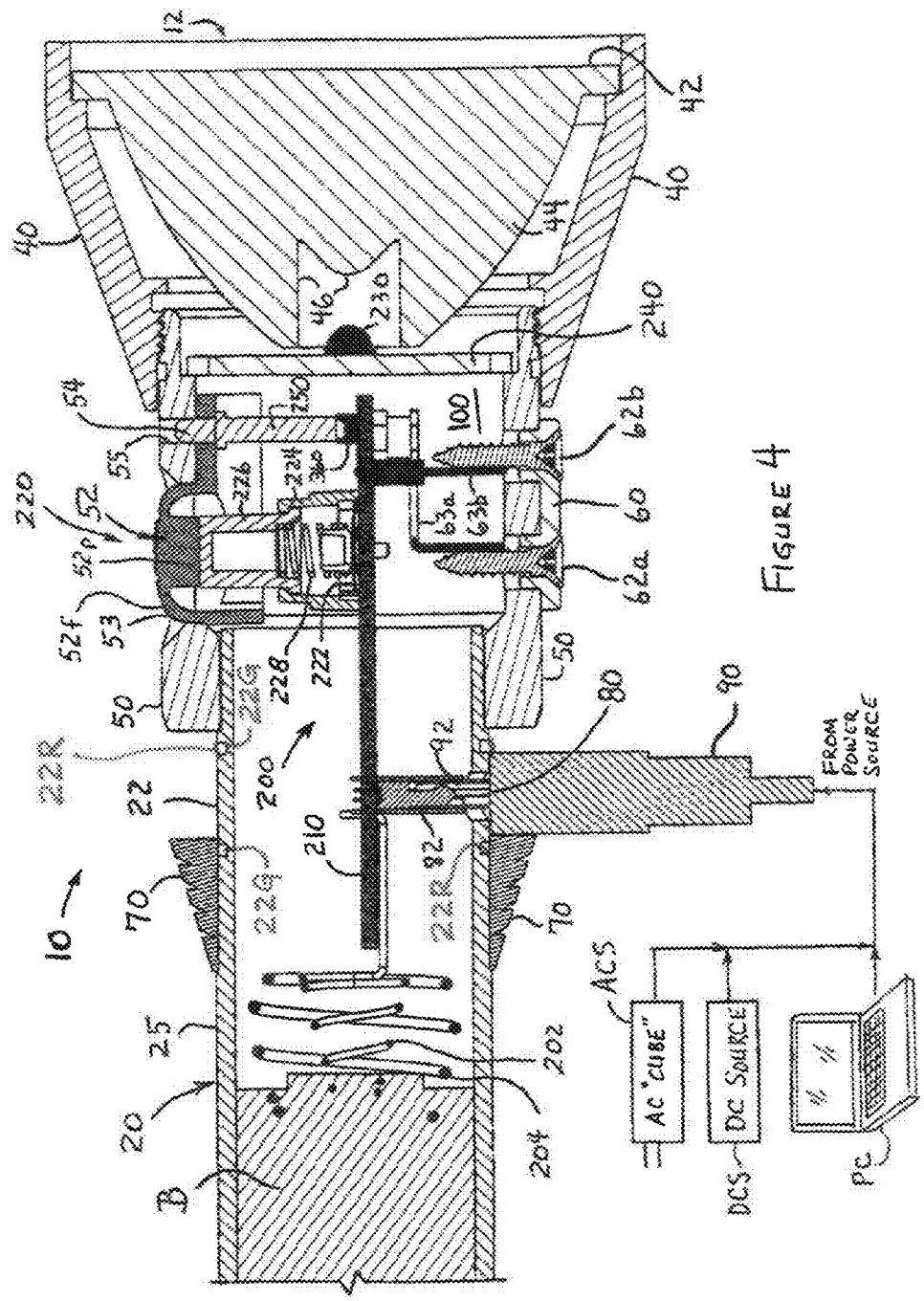
FIG. 4 is an enlarged cross-sectional side view of the forward portion of an example embodiment of a portable light similar to the example lights of FIGS. 2, 2A and 3.

FIG. 3 is a side cross-sectional side view of the example portable light of FIGS. 2 and 2A; and FIG. 4 is an enlarged cross-sectional side view of the forward portion of the example portable light 10 of FIGS. 2, 2A and 3. Externally visible features of light 10 described above are not described again. Example elements of light 10 internal to light housing 20 include battery B within barrel housing 25, module 100 disposed in barrel housing 25 and/or forward housing 50 and reflector or TIR optic 44 disposed in head housing 40. Preferably, a flexible boot 52 provides a seal at opening 53 that tends to prevent the entry of dirt, moisture and other unwanted material from entering housing 20.

LED light source 230 is disposed at an opening at the rearward smaller end of TIR optic 44 which extends to the larger forward end of head housing 40. The curved exterior surface of TIR optic 44 is shaped, typically symmetrically about the longitudinal axis of light 10, to reflect and form the light produced by LED 230 into a beam of light of a desired shape directed forwardly through forward lens 42. For example, the curved exterior wall of TIR optic 44 may generally be similar to a curved shape of a reflector and may have a flat or a shaped surface 46 adjacent to LED 230 for forming the light emitted thereby into a desired beam shape in TIR optic 44.

In the illustrated embodiment, the smaller end of TIR optic 44 has a recess 46 into which at least part of LED 230 extends, e.g., for more efficiently collecting the light from LED 230. Recess 46 in one preferred embodiment may have a generally cylindrical side wall and have a convex curved fundus (the bottom end or surface of the recess) for optically refracting at least part of the light from LED 230.

Lens 42 may be provided by a forward surface of TIR optic 44 or may be a separate lens 42, e.g., a sheet of generally transparent material, e.g., of plastic or glass, disposed at the forward opening of head housing 40. Surface 42, whether of TIR optic 44 or of a thicker lens 42, may have a shaped curved external forward surface thereby to provide an optical lens. TIR optic 44 and/or lens 42 may be retained in head housing 40 by a lens ring, a snap ring, a press fit, an adhesive or any other suitable means. Optionally, the curved exterior surface of TIR optic 44 may be reflectorized, e.g., have a silvered or aluminized or otherwise reflective plating or other coating, to reduce light loss at that surface Alternatively, LED light source 230 may be disposed at an opening at the rearward smaller end of a curved reflector 44 and a lens 42 may cover the larger forward end of reflector 44. The interior surface of reflector 44 may be shaped, typically symmetrically about the longitudinal axis of light 10 and reflector 44, to form the light produced by LED 230 into a beam of light of a desired shape directed forwardly through lens 42. Lens 42 may be a sheet of generally transparent material or may be a thicker lens having a shaped curved external surface of generally circular peripheral shape to generally conform to the circular shape of reflector 44 and head housing 40.

In the illustrated embodiment, head housing 40 has internal threads near its rearward end that engage external threads near the forward end of forward housing 50 for connecting housings 40, 50 together. Forward housing 50 and barrel 25 may be a single piece, may be press fit together or may be connected by a threaded connection. In other embodiments, housing 20 parts 25, 40, 50 may be connected by whatever means may be deemed convenient and desirable, or may be a single piece.

Internal to forward housing 50 is an example module 100 that in general may support elements of light 10, e.g., circuit board 210 and switch 220, and may provide electrical conductors and otherwise cooperates with other elements of light 10 to provide a control circuit 200 for operating light 10 and for controlling the operation thereof. Much of control circuit 200 is supported by and/or connected to circuit board 210 which extends longitudinally rearwardly from module 100.

Module 100 receives contact screws 62 which retain module 100 in a predetermined location within housing 20, 50 and retain guide member 60 on the exterior of housing 20, 50. Contact screws 62 also serve as external electrical contacts 62a, 62b, e.g., a charging port 62, for connecting light 10 to a charging device for charging and/or recharging the battery B therein via conductors 63a, 63b of module 100 (seen adjacent the threaded ends of contact screws 62) and control circuit 200 and via battery contact springs 202, 204.

Light source 230, e.g., LED 230, is preferably supported by module 100 near a forward face thereof in a position whereat LED 230 is located in a desired position relative to TIR optic 44 (or a reflector 44), thereby for producing a desired beam of light at forward end 12 of light 10. Preferably, a circuit board 240 provides one or more electrical connections for LED 230 and is supported near the forward end of module 100. Also preferably, circuit board 240 is of a type that has a relatively high thermally conductivity, e.g., having solder-filled conductive vias or being an aluminum clad circuit board, for removing heat generated by LED 230 in operation, and circuit board 240 cooperates with module 100 and/or head housing 40 for removing heat from LED 230. Where TIR optic 44, or alternatively reflector 44, are thermally conductive, TIR optic 44, or alternatively reflector 44, may also conduct heat away form LED 230.

Circuit board 210 may be supported, e.g., in a generally longitudinal direction within housing 20, 25, 50 by module 100 and may have a pair of contacts 202, 204 that extend rearwardly for making electrical contact with battery B. In the illustrated embodiment, the contacts 202, 204 include a pair of rearwardly extending concentric helical contact springs 202, 204, that respectively make electrical contact to a central terminal and to an annular terminal, both at the forward end of battery B. Alternatively, circuit board 210 may comprise more than one interconnected circuit boards.

Circuit board 210 supports a switch 220 that is actuatable externally from light 10 for actuating and controlling the operation of control circuit 200 and light source 230. Switch 220 includes a housing 224 having a movable actuator 226 therein, wherein actuator 226 includes a plunger 226, a helical spring 228 and a cup (not separately numbered). Adjacent circuit board 210 is a flexible metal dome 222 that is pressed by the spring 228 and cup of actuator 226 when actuator 226 is pressed radially inwardly from external to light housing 20 of light 10, thereby to make and break one or more electrical connections between conductors on circuit board 210 and flexible metal dome 222. Optionally, but preferably, one or more indicators 360 may be provided on circuit board 210 and may be selectively powered to produce light to indicate the status of the operation of light 10, e.g., the charging status of the battery B of light 10.

Between switch 220 and the environment external to light 10 is a flexible member 52 or boot 52 which seals an opening 53 of forward housing 50 through which switch 220 may be actuated from external to light 10. Boot 52 includes a thicker pushbutton portion 52p that is adjacent to plunger 226 of switch 220 and which is movable radially with respect to housing 20 because the curved portions 52f of boot 52 surrounding the thicker pushbutton 52p thereof are flexible to enable radial movement. Boot 52 has a peripheral skirt that bears against the sides of opening 53 and against the internal surfaces of housing 50 for providing a seal.

While many different kinds of electrical switches may be employed in the described arrangement, examples of suitable electrical switches that may be employed for switch 220 include those described in U.S. Pat. No. 8,110,760 entitled "Electrical Switch Having Plural Switching Elements, as for Controlling a Flashlight" and in U.S. Pat. Nos. 7,652,216 and 7,880,100 both entitled "Electrical Switch, as for Controlling a Flashlight," each of which is hereby incorporated herein by reference in its entirety.

Boot 52 preferably includes an optical member 54, e.g., a clear, transparent or translucent member 54, located at a location of boot 52 that is adjacent opening 55 of housing 50 for allowing light produced internally to housing 50 to be visible from outside of light 10. Module 100 preferably includes at least a space for allowing light produced by status indicator 360 on circuit board 210 to be visible through optical member 54 from external to light 10. Optical member may be molded into flexible boot 52 or may be a separate part that is pressed into opening 53 or into an opening in boot 52, or into both.

In one embodiment, module 100 has a passage 250 through which light produced by status indicator 360 is visible through optical member 54 from external to light 10, and in another embodiment, a light pipe 250, e.g., a clear, transparent or translucent light pipe 250, may be provided between status indicator 360 and optical member 54 for coupling light therebetween to be visible from external to light 10.

Circuit board 210 also supports a female USB connector 82 that extends radially into an opening in light housing 20, e.g., in the forward end of barrel 25 and/or the rearward end of forward housing 50, for providing USB port 80. USB connector 82 is accessible from external to light 10 for receiving a mating male USB connector 92 of USB cable 90 therein. Cable 90 may be a USB to USB cable, a mini-USB to USB cable, or other suitable cable that mates to USB port 80 and an external device that can serve as a source of electrical power for charging battery B of light 10. USB port 80 may be include a standard USB connector, a mini-USB connector, a micro-USB port, a standardized power connector, or any other standardized port of a type found on common electronic devices.

Typically, a suitable external device would include a charger for any of many common electronic devices and/or their batteries, wherein the charger provides an output via a USB cable or connectable via a USB cable. Examples include, e.g., a wall charger ACS, sometimes referred to as a "cube" charger, that plugs into an AC power source such as a 110 v or 220 v AC wall outlet, a DC source DCS that plugs into or connects to an external DC power source, e.g., a vehicle power system, a battery, and the like, and an electronic device itself. Suitable external electronic devices may include, e.g., computers, portable computers, tablet computers, personal digital devices, mobile phones, smart phones and the like, and the charging devices for any of the foregoing devices and/or their batteries.

Where light 10 receives charging power via USB port 80 from an electronic device, such device may be operating from its internal battery and/or from an external source of electrical power. Port 80 may be configured to receive any one or more of the available cables typically used with any of the foregoing devices and/or with cables that may be part of any of the foregoing devices. Typically, electrical power provided via a USB port or connector is at a nominal plus five (+5) volts and only limited current that is available at a standard USB port, however, the present arrangement 200, 300 may be configured to receive other voltage and current levels via a USB connector.

In FIGS. 2, 2A and 3, for example, USB port 80 and cover 70 are located near the rearward end of forward housing 50 of light housing 20 and USB port 80 is about in line with guide member 60, but could be at other locations thereon.

Figure 5:
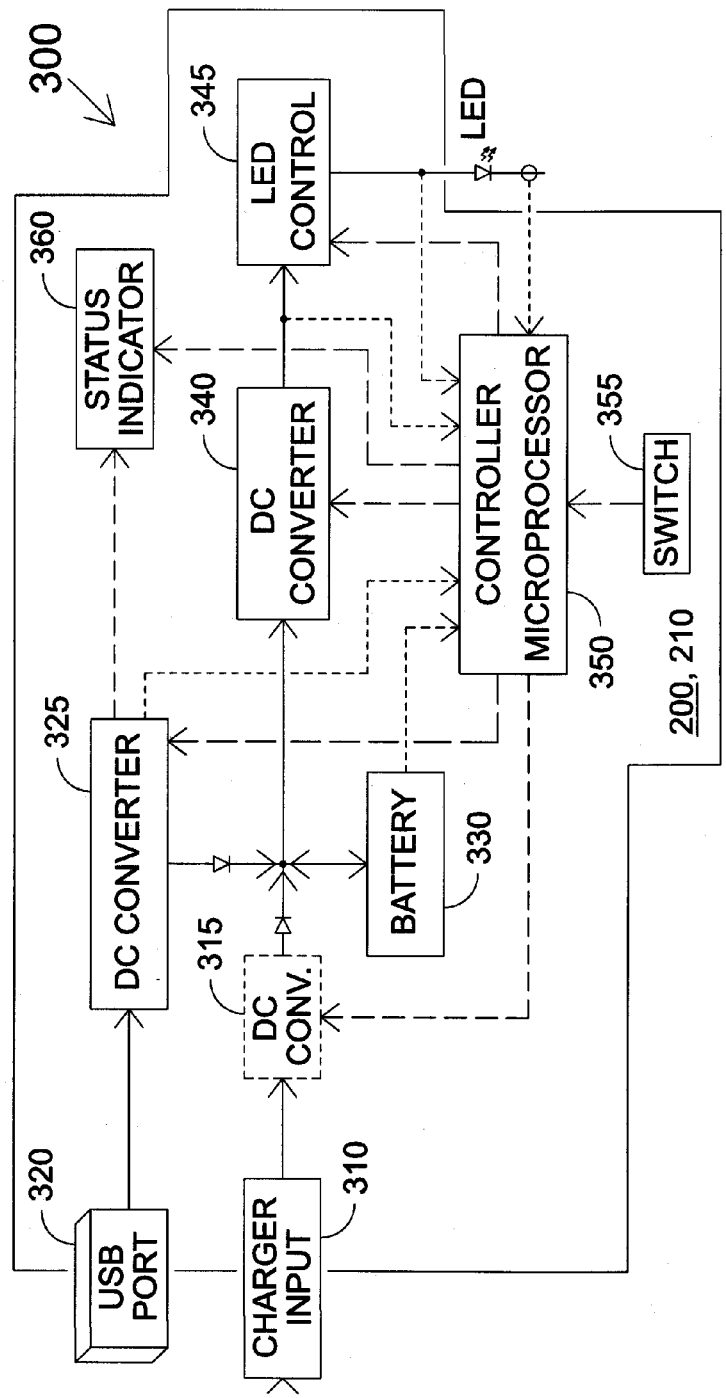
FIG. 5 is a schematic block diagram of an example embodiment of a portable light.

FIG. 5 is a schematic block diagram 300 of the example portable light 10 of FIGS. 1-4. Control circuit 200, most of which may be disposed on a circuit board 210, comprises circuitry for operating a light source LED from a battery 330 responsive to a user input, e.g., a switch 355 which may include one or more switches each having one or more switch contacts. Control circuit 200 further comprises circuitry for coupling one or more external sources of electrical power, e.g., charger input 310 and USB port 320, for charging and/or recharging battery 330. Control circuit 200 determines whether or not charging power is present and which of charging sources 310, 320 is providing charging power for controlling the charging of battery 330.

In general, charger port 210 may correspond to charging port 60, 62, USB port 320 may correspond to USB port 80, 82, battery 330 may correspond to battery B, light source LED may correspond to LED 230, and switch 355 may correspond to switch 220, in FIGS. 1-4.

In the illustrated embodiment 300, operation of control circuit 200 is determined by a controller 350 of which typical examples may include a micro-processor, micro-controller, a custom integrated circuit or other integrated circuit and/or digital processor. Controller 350 receives inputs from switch 355 and other elements of control circuit 200 and responds thereto at least for controlling the operation of light source LED and/or for the charging and/or recharging of battery 330 (also referred to as battery B). In one embodiment 300, the external charging device includes one or more elements that control the charging of battery 330 from charger input 310 and DC converter 325 controls the charging of battery 330 from USB port 320, and so controller 350 may be unpowered when light 10 is receiving charging power from an external source, either via charger input 310 or USB port 320.

Any or all of DC converters 315, 325 and/or 340, and/or LED control 345, may include all or part of the control circuitry necessary for providing at its respective output suitable voltage and/or current for operating in circuit 200, or any or all of DC converters 315, 325 and/or 340, and/or LED control 345, may be controlled by controller 350, or alternatively by more than one controller 350. Accordingly, controller 350 is illustrated as receiving feedback signals including voltages and/or currents at various points in circuit 200 and as providing control signals to the various elements 315, 325, 340, 345, 355 and/or 360, for monitoring and/or controlling the operation of control circuit 200 and light 10. The term DC converter is used herein in a generic sense, as explained further below.

For operating light source LED (also referred to as LED 230), controller 350 enables electrical power from battery 330 to be selectively coupled to light source LED for causing light source LED to selectively produce light. To this end control circuit 200 may include a DC converter 340 which converts the voltage provided by battery 330 to a voltage and current more suitable for desired operation of light source LED. DC converter 340 may be configured to directly provide the desired operating voltage and/or desired operating current to light source LED or an LED control 345 may be employed to provide the desired operating voltage and/or operating current to light source LED from the output voltage and/or current from DC converter 340. Either or both of DC converter 340 and LED control 345 may include circuitry for controlling their respective operation, or they may be controlled by controller 350.

While light emitting diode light sources LED may be operated by applying a desired voltage, it is preferred in the present arrangement to control the current flowing through the LED to a desired value. To that end, the value of LED current is fed back to controller 350 which provides control signals to DC converter 340 and to LED control 345 to establish and maintain the desired level of LED current flowing through light source LED. Where LED control 345 includes a control element, e.g., a field effect or other transistor, controller 350 may also receive feedback of the output voltage from DC converter 340 and provide a control signal thereto to establish and maintain the output voltage from DC converter 340 at a desired value, e.g., a value that tends to minimize the voltage drop across the series control element of LED control 345, thereby to improve its efficiency.

Controller 350 is responsive to switch 355 which may include one or more switches each having one or more switch contacts, e.g., where plural switches are located at different locations on light 10 for facilitating a user to hold light 10 in various manners. One example thereof is to provide a forward switch 355, e.g., a switch 355 located on a forward portion of barrel 25, on forward housing 50 and/or on head housing 40, and/or a tail switch, e.g., a switch 355 located on or near tail cap 30.

Charging power may be supplied to battery 330 either from charger input 310 (and optionally via DC converter 315) or from USB port 320 via DC converter 325, which are typically not both active at the same time. However, so that power is not undesirably passed from input 310 to USB port 320 or from USB port 310 to DC converter 325 and/or charger input 320, a circuit element may be provided to prevent such flow of power, e.g., shown schematically as a pair of diodes with their respective cathodes connected together, one in series with charger input 310 and the other in series with the output of DC converter 325, so that power from charger input 310 and from USB port 320 can flow to battery 330 and/or to DC converter 340, but not between charger port 310 and USB port 320 or between USB port 320 and charger port 310.

DC converter 325 receives plus five volts (+5 v.) from USB input 320 and converts that voltage to a voltage and current suitable for charging battery 330. While DC converter may be controlled by controller 350 for charging battery 330, in one embodiment DC converter 325 includes charging circuitry that controls the output voltage and current from DC converter 325 to levels suitable for charging battery 330. DC converter 325 may also provide a signal to indicator 360 to indicate that electrical power is being received at USB port 320. In one embodiment, for example, the signal from DC converter 325 to indicator 360 is the +5 v. USB power which indicator 360 utilizes to light an indicator LED thereof.

Typically, portable lights or other portable devices that include a rechargeable battery are provided with a charging device (charger) that is suited for properly charging and recharging the battery thereof, or a suitable charging device is at least available and/or recommended. In the preferred embodiment, the supplied charging device preferably includes a receptacle for receiving light 10 in a manner wherein guide member 60 guides light 10 into the charger in proper orientation for charging contacts 62 to make contact with corresponding contacts of the charging device, thereby for charging power to be applied to light 10 via charger input 310. In the preferred embodiment, the supplied charger also includes control circuitry so that it provides suitable voltages and currents via charger input 310 for charging and recharging battery 330, and for maintaining battery 330 in a substantially fully charged condition when light 10 is stored or otherwise remains in the charger for substantial periods of time.

Where the charging device does not include suitable control circuitry, control circuit 200 may optionally include DC converter 315 for controlling the voltage and current applied from the external charger via input 310 to battery 330 for properly charging, recharging and/or maintaining full charge of battery 330, e.g., where the voltage and/or current supplied by the charging device is higher and/or lower than that desired for charging the battery 330, and/or where circuitry for controlling the charging of battery B is required or desired.

Control circuitry for controlling the charging voltage and/or charging current applied to battery 330 may be provided by controller 350 which typically receives as feedback signals the battery voltage, and optionally battery current and/or temperature, for controlling the battery charging voltage and/or current to appropriate levels. Controller 350 may control the charging of battery 330 when charging power is provided via USB port 320 and DC converter 325. Optionally, controller 350 may be configured to determine from the voltage and/or current levels of battery 330 at various conditions, e.g., at open circuit, under a load and/or with a known charging current applied, the type, e.g., the battery chemistry type, of battery 330, e.g., alkaline, nickel-cadmium, nickel-metal-hydride, lithium-ion, and the like.

Example embodiments of controllers may be found in US Patent Publication 2012-0236551 entitled "LIGHT HAVING A COMPARTMENT ACCOMMODATING BATTERIES OF DIFFERENT TYPES, SIZES AND/OR SHAPES" and in US Patent Publication 2012-0235593 entitled "LIGHT HAVING A CIRCUIT ACCOMMODATING BATTERIES OF DIFFERENT TYPES AND/OR SIZES," both published Sep. 20, 2012, and in U.S. Pat. No. 8,258,416 entitled "ELECTRICAL SWITCH AND FLASHLIGHT," each of which is hereby incorporated herein by reference in its entirety.

Optionally, but preferably in the described embodiment, status indicator 360 indicates the status of the operating state of light 10. Status indicator 360 typically includes one or more sources of light, e.g., light emitting diodes or LEDs, that indicate status, preferably the charge state of battery 330. In a preferred embodiment, but optionally, a green LED is illuminated to indicate that battery B is at or near a fully charged state and so is in a good condition for being used, a red LED is illuminated to indicate that battery B is in a relatively low charge state and/or is being charged, and/or a blue LED is illuminated to indicate that power is being received at USB port 320 and so is charging or has charged battery 330. In addition, any of the indicator LEDs may be illuminated in a blinking and/or flashing mode to provide further information concerning the operating state of light 10 and/or of battery 330.

Controller 350 is preferably an integrated circuit that includes processing for controlling and operating light 10 and a memory for storing instructions for controlling and operating light 10, e.g., software instructions. Controller 350 preferably is a digital processor, such as a microprocessor, that receives signals at several of its terminals, that processes those received signals in accordance with software instructions stored in its memory, and that provides controlling signals at others of its terminals for controlling electronic circuits connected thereto that control and operate, e.g., DC converters 315, 325, 340, LED control 345, and status indicator 360. Status indicator 360 may be powered from USB port 320 when that port is powered.

A user or operator of light 10 controls the operation of light 10 by actuating a switch 355, e.g., an ON/OFF signaling circuit, which may comprise one or more switches each having one or more switch contacts. Instructions from the operator or user of light 10 are provided to controller 350 via the user actuated switch 355, e.g., the switch 220 that is actuated using selector actuator 226. Switch 355 may be actuated one or more times and/or for various times and durations for signaling a desired operating condition. For example, a single momentary actuation may be employed to turn light 10 ON if it is OFF and to turn light 10 OFF if it is ON. For example, a longer actuation may be employed to turn light 10 ON and the duration of the actuation may be detected by controller 350 for adjusting the brightness of light source LED 230, and a sequence of momentary actuations may be employed to signal controller 350 to cause light source LED 230 to operate in a blinking mode or in a flashing mode or in a strobe mode, or in another desired mode.

Controller 350, whether a digital processor/controller or another controller, may be programmed to respond to closures of the respective contacts of the one or more switches 355 in any desired manner and to provide any desired function or feature. By way of another example, in addition to momentary ON, continuous ON and OFF responses as described above, controller 350 could respond to closure of a contact of either of the one or more switches 355 when light 10 is in the continuous ON state to provide a change in the brightness of the light produced. This dimming action could be in response to successive closures of a contact of switch 355 to produce successive increments of changed brightness or could be in response to the time that a contact of switch 355 is held closed. Increments of brightness change could be provided in any desired increment size, whether each increment is sufficiently large to be perceived by a human or not. Brightness change could be monotonic in that brightness dimming stops at a predetermined minimum brightness, which could include no light output, or could repetitively cycle down and up in brightness similar to that described above.

By way of another example, controller 350 could interpret two quick contact and release sequences of contacts of switch 355, "double clicking," to enter a flashing light operation, or could respond to the number of such closures and/or the duration thereof to select one or more light sources to be energized from among plural light sources, or to select light sources of differing colors, or any other function that may be desired.

Additional features may be provided wherein controller 350, rather than simply implementing a single function in response to a switch closure, includes a more complex controller or processor, e.g., such as a microprocessor or digital processor. In such embodiment, controller 350 may be programmed to provide, for example, a momentary ON state, a continuous ON state, and an OFF state, of light source LED 230 in response to closures and openings of contacts of switches 355 in like manner to that described in the preceding paragraphs. In addition, controller 350 may also be programmed to respond to other conditions of switches 355, e.g., conditions based upon the number of actuations of a particular contact, the time between actuations of a particular contact, the time of continuous actuation of a particular contact, and/or combinations thereof. Further, a controller 350 may be programmed to provide a response to actuation of one of a switch 355 that differs from an identical actuation of another of switch 355, or to a sequence of actuations according to which of switches 355 are actuated and the timing and ordering thereof.

In one example embodiment, a flashing light mode and a dimming mode may be provided by controller 350. For example, rapidly closing and opening contacts of one or more switches 355 two times in quick succession (e.g., "double clicking" switch 355) may be utilized to enter, for example, a flashing light state wherein light source LED 230 alternates between producing light (ON) and not producing light (OFF) at a predetermined rate. In other words, quickly actuating switch 355 within a short time period, e.g., within about 0.3 seconds, in a manner that would otherwise cause the light to enter or exit a continuous ON state, causes the light to operate in a flashing mode, with light source LED 230 flashing ON and OFF, e.g., at an about 12 Hz or other desired rate.

Typically, controller integrated circuits (IC) have various "ports" at which signals and/or data may be received by controller 350 and/or provided by controller 350. Each "port" commonly connects to plural terminals of controller 350 and the functioning thereof may be configured or programmed by instructions stored in the memory of controller 350 so as to have different characteristics, e.g., to serve as an analog input, as an analog output, as a digital input or as a digital output. Typically each port corresponds to plural terminals (pins) of the physical integrated circuit, wherein when the port is configured as a digital port, each pin carries one bit of a multi-bit digital signal received and/or outputted as a parallel multi-bit digital "word" when the data output is digital, and as plural analog terminals wherein the port is configured as an analog port. One common format provides ports as, e.g., an eight-bit port (a port using eight terminals of the physical IC). In some instances, the terminals of controller 350 may be configured individually or in groups partly as digital terminals and partly as analog terminals.

While DC converter 325 is typically configured to receive electrical power provided via a USB port or connector 320 at a nominal plus five (+5) volts and only limited current, the present arrangement 200, 300 including DC converters 325 and 315 may be configured to receive other voltage and current levels via USB input 320 and/or charging input 310.

FIG. 6 is an enlarged cross-sectional perspective view of the forward portion of an example embodiment of a portable light 10 that is similar to the embodiment of FIG. 4. In FIG. 6, however, USB port 80 and cover 70 are located near the rearward end of forward housing 50 of light housing 20 and USB port 80 is about in line with switch 220 and is about 180° radially removed from guide member 60. The arrangement of the elements of light 10 are described above and will not be repeated here.

In head housing 40 of this embodiment are a reflector 44 with a generally flat lens 42 covering the larger forward end thereof and with LED 230 near the smaller rearward end thereof. AS above, LED 230 may be mounted to a circuit board 240 located near the forward end of module 100. Reflector 44 has a curved reflectorized interior surface for forming the light produced by LED 230 into a beam of desired shape directed forwardly through lens 42. Reflector 44 may have a parabolic, hyperbolic or other desired curvature.

USB port 80 connector 82 in this embodiment is mounted to the same side (broad surface) of circuit board 210 as is switch 220 so as to extend through an opening of housing 20 near to that for switch 220.

In a typical embodiment, LED 230 is a high output LED, e.g., an about 3-watt, high brightness LED available from Cree Incorporated, located in Durham, N.C., that is operated at a current level of about 1000 milliamperes, or may be an about 11-watt, about 1000 lumen high brightness LED also available from Cree Incorporated, that is operated at a current level of about 3000-3500 milliamperes. Controller 350 may be a type AZQ119N available from Azoteq, Inc. of Paarl, South Africa. Battery B, 330 may be a nickel-cadmium (Ni—Cd), nickel-metal-hydride (NiMH) or lithium-ion (Li-Ion) battery type of a suitable number of cells and cell capacity for providing a desired operating time for the particular LED 230 employed. Battery B, 330 may have one or more battery cells, e.g., one, two, three, four, or five or more battery cells, as may be deemed suitable for any particular light 10.

Various embodiments may employ a three cell Ni—Cd battery producing about 3.6 volts, a four cell NiMH battery typically producing about 4.8 volts, a five cell NiMH battery typically producing about 6 volts, a Li-Ion battery typically producing about 3.5 volts, or a two-cell Li-Ion battery typically producing about 7 volts, it being noted that the voltages produced thereby will be higher when approaching full charge and will be lower in discharge, particularly when providing higher current and when reaching a low level of charge, e.g., becoming discharged. While batteries of voltage less than five volts could be charged directly from a USB port 80, it is preferred that a DC converter 325 be provided for controlling the charging of battery B, 330. Where an external charger provides a voltage, e.g., 3.6 volts, that is less than the battery charging voltage, a DC converter 315 may be employed.

A portable light 10 may comprise: a light housing 20 having a cavity for receiving a battery, a light source 230, LED in the light housing 20; an electrical switch 220 actuatable from outside the light housing 20; a control circuit 200, 300 in the light housing 20 connecting the light source 230, LED in circuit with a battery for selectively energizing the light source 230, LED responsive to the electrical switch 220; a first electrical charging port 60, 310 on the light housing 20 coupled to the battery by the control circuit 200, 300 for charging the battery; and a second electrical charging port 80, 320 on the light housing 20 coupled to the battery by the control circuit 200, 300 for charging the battery. The second electrical charging port 80, 320 may include a USB connection for receiving battery charging current. The first electrical charging port 60, 310 and the second electrical charging port 80, 320 may provide battery charging current at different supply voltages, and the control circuit 200, 300 may comprise at least one voltage converter 315, 325 for coupling at least one of the first electrical charging port 60, 310 and the second electrical charging port 80, 320 to the battery. The first electrical charging port 60, 310 may include a guide member 60 for seating the light housing 20 in a charging device and at least one electrical contact 62 for making electrical connection to the charging device. The portable light 10 may further comprise a slidable cover 70 slidable relative to the light housing 20 for covering and uncovering the USB connection of the second electrical charging port 80, 320. The control circuit 200, 300 may include at least one light emitting indicator 360, the light housing 20 having an opening through which light can pass adjacent the at least one light emitting indicator 360. The portable light 10 may further comprise a cover member 52 that may have a transparent or translucent insert 54 therein providing the opening of the light housing 20. The USB connection may include a USB connector, a mini-USB connector, a micro-USB port, or another standardized power connector. The control circuit 200, 300 may include a DC converter 315, 325 coupling the second electrical charging port 80, 320 to the battery for charging the battery. The DC converter 315, 325 may include a battery charging circuit for controlling the charging of the battery. The control circuit 200, 300 may further include a second DC converter 315, 325 coupling one of the first and second electrical charging ports 60, 310, 80, 320 to the battery for charging the battery. The control circuit 200, 300 may include circuitry for controlling the charging of the battery; or may include an external charging device that may include circuitry for controlling the charging of the battery; or may include an external charging device that may include circuitry for controlling the charging of the battery from the first electrical charging port 60, 310 and the control circuit 200, 300 may include circuitry for controlling the charging of the battery from the second electrical charging port 80, 320. The USB connection may receive electrical power at a nominal plus five volts.

A portable device 10 may comprise: a device housing 20 having a cavity for receiving a battery; an operating element 230 in the device housing 20; an electrical switch 220 actuatable from outside the device housing 20; a control circuit 200, 300 in the device housing 20 connecting the operating element 230 in circuit with a battery for selectively energizing the operating element 230 responsive to the electrical switch 220; a first electrical charging port 60, 310 on the device housing 20 coupled to the battery by the control circuit 200, 300 for charging the battery; and a second electrical charging port 80, 320 on the device housing 20 coupled to the battery by the control circuit 200, 300 for charging the battery. The second electrical charging port 80, 320 may include a USB connection for receiving battery charging current. The first electrical charging port 60, 310 and the second electrical charging port 80, 320 may provide battery charging current at different supply voltages, and the control circuit 200, 300 may comprise at least one voltage converter 315, 325 for coupling at least one of the first electrical charging port 60, 310 and the second electrical charging port 80, 320 to the battery. The first electrical charging port 60, 310 may include a guide member 60 for seating the device housing 20 in a charging device and at least one electrical contact 62 for making electrical connection to the charging device. The portable device 10 may further comprise a slidable cover 70 slidable relative to the device housing 20 for covering and uncovering the USB connection of the second electrical charging port 80, 320. The control circuit 200, 300 may include at least one light emitting indicator 360, the device housing 20 having an opening through which light can pass adjacent the at least one light emitting indicator 360. The portable device 10 may further comprise a cover member 52 having a transparent or translucent insert 54 therein providing the opening of the device housing 20. The USB connection may include a USB connector, a mini-USB connector, a micro-USB port, or a standardized power connector. The control circuit 200, 300 may include a DC converter 315, 325 coupling one of the first and second electrical charging ports 60, 310, 80, 320 to the battery for charging the battery. The DC converter 315, 325 may include a battery charging circuit for controlling the charging of the battery. The control circuit 200, 300 may further include a second DC converter 315, 325 coupling the first electrical charging port 60, 310 to the battery for charging the battery. The control circuit 200, 300 may include circuitry for controlling the charging of the battery; or may include an external charging device may include circuitry for controlling the charging of the battery; or may include an external charging device may include circuitry for controlling the charging of the battery from the first electrical charging port 60, 310 and the control circuit 200, 300 may include circuitry for controlling the charging of the battery from the second electrical charging port 80, 320. The USB connection may receive electrical power at a nominal plus five volts.

A portable light or device 10 may comprise: a device housing 20 having a cavity for receiving a battery; an operating element 230 in the device housing 20; an electrical switch 220 actuatable from outside the device housing 20; a control circuit 200, 300 in the device housing 20 connecting the operating element 230 in circuit with a battery for selectively energizing the operating element 230 responsive to the electrical switch 220; a first electrical charging port 60, 310 on the device housing 20 coupled to the battery by the control circuit 200, 300 for charging the battery; and a second electrical charging port 80, 320 on the device housing 20 coupled to the battery by the control circuit 200, 300 for charging the battery. The portable light or device 10 wherein the second electrical charging port 80, 320 includes a USB connection for receiving battery charging current.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Although terms such as "up," "down," "left," "right," "front," "rear," "side," "top," "bottom," "forward," "backward," "under" and/or "over," and the like may be used herein as a convenience in describing one or more embodiments and/or uses of the present arrangement, the articles described may be positioned in any desired orientation and/or may be utilized in any desired position and/or orientation. Such terms of position and/or orientation should be understood as being for convenience only, and not as limiting of the invention as claimed.

The term DC converter is used herein to refer to any electronic circuit that receives at an input electrical power at one voltage and current level and provides at an output DC electrical power at a different voltage and/or current level. Examples may include a DC-DC converter, an AC-DC converter, a boost converter, a buck converter, a buck-boost converter, a single-ended primary-inductor converter, a series regulating element, a current level regulator, and the like. The input and output thereof may be DC coupled and/or AC coupled, e.g., as by a transformer and/or capacitor. A DC converter may or may not include circuitry for regulating a voltage and/or a current level, e.g., at an output thereof, and may have one or more outputs providing electrical power at different voltage and/or current levels and/or in different forms, e.g., AC or DC.

The term battery is used herein to refer to an electrochemical device comprising one or more electro-chemical cells and/or fuel cells, and so a battery may include a single cell or plural cells, whether as individual units or as a packaged unit. A battery is one example of a type of an electrical power source suitable for a portable device. Other devices could include fuel cells, super capacitors, and the like.

While the present invention has been described in terms of the foregoing example embodiments, variations within the scope and spirit of the present invention as defined by the claims following will be apparent to those skilled in the art. For example, while the external port for receiving charging power is described as a USB port 80 that employs a USB connector, the port 80 connector may be a USB connector, a mini-USB connector and/or other similar standardized connectors as are typically used for and with various electronic devices, e.g., computers, portable computers, tablet computers, personal digital devices, mobile phones, smart phones and the like, and the charging devices for any of the foregoing devices. Port 80 may receive any of the available cables typically used with any of the foregoing devices and/or with cables that may be part of any of the foregoing devices.

In addition, USB port 80 may be located at any desired location on light 10, including locations other than the three example locations illustrated herein. For example, USB port 80 could be located on or near tail cap 30 or could be located on or near forward end 12, e.g., directed forwardly near the forward periphery thereof adjacent to lens 42.

While various types and kinds of charging devices are described, e.g., AC sources, DC sources and a computer PC, it is noted that other charging devices may be employed, e.g., fuel cells, super capacitors, solar cells, solar powered chargers, hand-cranked generators, and the like.

Further, while the guide member 60 is illustrated as being on the forward housing 50, it could be located elsewhere on light housing 20, e.g., on the exterior of barrel 25 or on the exterior of head housing 40. While an example guide member 60 is illustrated as a generally triangular member that guides the light 10 into an associated charging device, e.g., as is described in U.S. Pat. No. 5,432,689 entitled "FLASHLIGHT AND RECHARGING SYSTEM THEREFOR," which is hereby incorporated herein by reference in its entirety, guides of other types, shapes and/or sizes may be employed in the present arrangement.

Controller 350 may comprise dedicated circuits 360 that have a fixed predetermined response to various switch 220, 355 closures, direct acting circuits such as an amplifier and/or a flip flop. Alternatively, controller 350 may comprise a controller or processor or digital processor that can provide a more sophisticated ability to interpret the closures of contacts of switches 220, 355, e.g., in relation to time and/or frequency of switch closures as well as presence or absence of switch closures.

While certain features may be described as a raised feature, e.g., a ridge, boss, flange, projection or other raised feature, such feature may be positively formed or may be what remains after a recessed feature, e.g., a groove, slot, hole, indentation, recess or other recessed feature, is made. Similarly, while certain features may be described as a recessed feature, e.g., a groove, slot, hole, indentation, recess or other recessed feature, such feature may be positively formed or may be what remains when a raised feature, e.g., a ridge, boss, flange, projection or other raised feature, is made.

Each of the U.S. Provisional Applications, U.S. Patent Applications, and/or U.S. Patents identified herein are hereby incorporated herein by reference in their entirety, for any purpose and for all purposes irrespective of how it may be referred to herein.

Finally, numerical values stated are typical or example values, are not limiting values, and do not preclude substantially larger and/or substantially smaller values. Values in any given embodiment may be substantially larger and/or may be substantially smaller than the example or typical values stated.

What is claimed is:

1. A portable light comprising:
   a light housing having a barrel, a forward housing and a cavity for receiving a battery;
   a light source in a head housing of the forward housing of the light housing for providing illumination;
   an electrical switch actuatable from outside said light housing;
   a control circuit in said light housing configured to connect said light source in circuit with the battery for selectively energizing said light source responsive to said electrical switch;
   a first electrical charging port on said forward housing coupled to the battery by said control circuit for charging the battery, said first electrical charging port including a guide member for seating said light housing in a charging device external to said portable light and configured to receive said portable light, said first electrical charging port further including one or more electrical contacts associated with said guide member configured to make electrical connection to the external charging device to receive battery charging current therefrom when said portable light is received therein;
   a second electrical charging port proximate a forward end of the barrel of said light housing coupled to the battery by said control circuit for charging the battery, said second electrical charging port including a USB port including a USB connector mounted to a circuit board interior to said light housing for receiving battery charging current from a second source of electrical power that is external to said portable light,
   wherein said control circuit includes at least one DC converter for coupling at least one of said first electrical charging port and said second electrical charging port to the battery for providing battery charging current thereto; and
   a movable cover movable in a recess on a forward part of said light housing to cover said second electrical charging port and to uncover said second electrical charging port.

2. The portable light of claim 1 wherein said control circuit includes a DC converter coupling said second electrical charging port to the battery for charging the battery.

3. The portable light of claim 2 wherein said DC converter includes a battery charging circuit for controlling the charging of the battery.

4. The portable light of claim 2 wherein said control circuit further includes a second DC converter coupling one of said first and second electrical charging ports to the battery for charging the battery.

5. The portable light of claim 1 wherein said control circuit includes at least one light emitting indicator, said light housing having an opening through which light can pass adjacent said at least one light emitting indicator.

6. The portable light of claim 5 further comprising a cover member having a transparent or translucent insert therein providing the opening of said light housing.

7. The portable light of claim 1 wherein said first electrical charging port and said second electrical charging port receive battery charging current at different supply voltages, wherein said DC converter comprises at least one voltage converter for coupling at least one of said first electrical charging port and said second electrical charging port to the battery.

8. The portable light of claim 1 wherein said movable cover comprises:
a slidable cover slidable relative to said light housing for covering and uncovering the USB connector of said second electrical charging port; or
a slidable cover slidable relative to said light housing between a light head thereof and an end of a reduced diameter portion thereof for covering and uncovering the USB connector of said second electrical charging port; or
a slidable cover slidable relative to said light housing for covering and uncovering the USB connector of said second electrical charging port including one or more seals therefor; or
a slidable cover slidable relative to said light housing between a light head thereof and an end of a reduced diameter portion thereof for covering and uncovering the USB connector of said second electrical charging port including one or more seals therefor.

9. The portable light of claim 1 wherein the USB connection includes a USB connector, a mini-USB connector, a micro-USB port, or a standardized power connector.

10. The portable light of claim 1 wherein:
said control circuit includes circuitry for controlling the charging of the battery; or
an external charging device includes circuitry for controlling the charging of the battery; or
an external charging device includes circuitry for controlling the charging of the battery from said first electrical charging port and said control circuit includes circuitry for controlling the charging of the battery from said second electrical charging port.

11. The portable light of claim 1 wherein said USB connector receives electrical power at a nominal plus five volts.

12. The portable light of claim 1 further comprising a battery in the cavity of said light housing.

13. A portable device comprising:
a device housing having a barrel, a forward housing and a cavity for receiving a battery;
an operating element in an element housing connected to the forward housing of the device housing;
an electrical switch actuatable from outside said device housing;
a control circuit in said device housing configured to connect said operating element in circuit with the battery for selectively energizing said operating element responsive to said electrical switch;
a first electrical charging port on said forward housing coupled to the battery by said control circuit for charging the battery, said first electrical charging port including a guide member for seating said device housing in a charging device external to said portable device and configured to receive said portable device, said first electrical charging port further including one or more electrical contacts associated with said guide member configured to make electrical connection to the external charging device to receive battery charging current therefrom when said portable device is received therein;
a second electrical charging port proximate a forward end of the barrel of said device housing coupled to the battery by said control circuit for charging the battery, said second electrical charging port including a USB port including a USB connector mounted to a circuit board interior to said device housing for receiving battery charging current from a second source of electrical power that is external to said portable device,
wherein said control circuit includes at least one DC converter for coupling at least one of said first electrical charging port and said second electrical charging port to the battery for providing battery charging current thereto; and
a movable cover movable in a recess on a forward part of said device housing for covering and uncovering the USB connector of said second electrical charging port.

14. The portable device of claim 13 wherein said control circuit includes a DC converter coupling one of said first and second electrical charging ports to the battery for charging the battery.

15. The portable device of claim 14 wherein said DC converter includes a battery charging circuit for controlling the charging of the battery.

16. The portable device of claim 14 wherein said control circuit further includes a second DC converter coupling said first electrical charging port to the battery for charging the battery.

17. The portable device of claim 13 wherein said control circuit includes at least one light emitting indicator, said device housing having an opening through which light can pass adjacent said at least one light emitting indicator.

18. The portable device of claim 17 further comprising a cover member having a transparent or translucent insert therein providing the opening of said device housing.

19. The portable device of claim 13 wherein said first electrical charging port and said second electrical charging port receive battery charging current at different supply voltages, wherein said DC converter comprises at least one voltage converter for coupling at least one of said first electrical charging port and said second electrical charging port to the battery.

20. The portable device of claim 13 wherein said movable cover comprises:
a slidable cover slidable between opposite ends of a reduced diameter portion of said device housing for covering and uncovering the USB connector of said second electrical charging port; or
a slidable cover slidable between opposite ends of a reduced diameter portion of said device housing for covering and uncovering the USB connector of said second electrical charging port including one or more seals therefor.

21. The portable device of claim 13 wherein the USB connector includes a USB connector, a mini-USB connector, a micro-USB port, or a standardized power connector.

22. The portable device of claim 13 wherein:
said control circuit includes circuitry for controlling the charging of the battery; or
an external charging device includes circuitry for controlling the charging of the battery; or
an external charging device includes circuitry for controlling the charging of the battery from said first electrical charging port and said control circuit includes circuitry for controlling the charging of the battery from said second electrical charging port.

23. The portable device of claim 13 wherein said USB connector receives electrical power at a nominal plus five volts.

24. The portable device of claim 13 further comprising a battery in the cavity of said device housing.

25. A portable device comprising:
a device housing having a cavity for receiving a battery;
an operating element in the device housing;
an electrical switch actuatable from outside said device housing;
a control circuit in said device housing configured to connect said operating element in circuit with the battery for selectively energizing said operating element responsive to said electrical switch;
a first electrical charging port on a forward housing of said device housing coupled to the battery by said control circuit for charging the battery, said first electrical charging port including a guide member for seating said device housing in a charging device external to said portable device and configured to receive said portable device, said first electrical charging port further including one or more electrical contacts associated with said guide member configured to make electrical connection to the external charging device to receive battery charging current therefrom when said portable device is received therein;
a second electrical charging port in a reduced diameter portion of said device housing including a USB connector mounted to a circuit board interior to said device housing and coupled to the battery by said control circuit for charging the battery from a second source of electrical power that is external to said portable device,
wherein said control circuit includes at least one DC converter for coupling at least one of said first electrical charging port and said second electrical charging port to the battery for providing battery charging current thereto; and
a movable cover separate from the forward housing and the operating element, said movable cover being movable in first and second directions in the reduced diameter portion of said device housing for covering and uncovering the USB connector of said second electrical charging port.

26. The portable device of claim 25 further comprising a battery in the cavity of said device housing.

27. A portable light comprising:
an elongated light housing having a cavity for receiving a battery, said elongated light housing including a barrel and a forward housing, said elongated light housing defining an axial direction and an elongated side;
a light source supported by a head housing of said elongated light housing near one end thereof for providing illumination;
an electrical switch actuatable from outside said elongated light housing;
a control circuit in said elongated light housing configured to connect said light source in circuit with the battery in said elongated light housing for selectively energizing said light source responsive to said electrical switch;
a first electrical charging port on the barrel of said elongated light housing and coupled to the battery by said control circuit for charging the battery, said first electrical charging port including a USB connector for receiving battery charging current from a source of charging current that is external to said portable light;
a slidable cover separate from said forward housing and said light housing and that is captive on the barrel of said elongated light housing between the forward housing and a shoulder of a recess of the barrel of said elongated light housing and is slidable in the axial direction along the barrel of said elongated light housing toward and way from an end thereof for covering and uncovering the USB connector of said first electrical charging port; and
a second electrical charging port including a guide member and one or more electrical contacts on said forward housing coupled to the battery by said control circuit for charging the battery when seated in a charging device external to said portable light and configured to receive said portable light.

28. The portable light of claim 27 further comprising:
a second electrical charging port on said elongated light housing coupled to the battery by said control circuit for charging the battery, and
wherein said first electrical charging port and said second electrical charging port receive battery charging current at different supply voltages, said control circuit comprising at least one voltage converter for coupling at least one of said first electrical charging port and said second electrical charging port to the battery.

29. The portable light of claim 28 wherein said second electrical charging port includes a guide member for seating said elongated light housing in a charging device and at least one electrical contact associated with said guide member for making electrical connection to the charging device.

30. The portable light of claim 27 wherein said slidable cover includes;
a cover having a cylindrical interior that is slidable in the axial direction along a cylindrical portion of the barrel of said elongated light housing; or
a cover having a cylindrical interior that is slidable in the axial direction along a cylindrical portion of the barrel of said elongated light housing including one or more seals therefor.

31. The portable light of claim 27 further comprising a battery in the cavity of said elongated light housing.

* * * * *